United States Patent [19]
Belart

[11] 3,827,242

[45] Aug. 6, 1974

[54] MASTER CYLINDER FOR A TWO-CIRCUIT BRAKE SYSTEM

[75] Inventor: Juan Belart, Walldorf, Germany

[73] Assignee: PTT Industries, Inc., New York, N.Y.

[22] Filed: Nov. 20, 1972

[21] Appl. No.: 307,910

[30] Foreign Application Priority Data
Dec. 24, 1971 Germany............................ 2164590

[52] U.S. Cl..................................... 60/552, 60/582
[51] Int. Cl.............................................. F15b 7/00
[58] Field of Search........ 91/376, 378, 391; 60/547, 60/549, 552, 553, 560, 565, 566, 582

[56] References Cited
UNITED STATES PATENTS
2,916,882  12/1959  Spalding et al. ...................... 91/378
3,638,528  2/1972  Lewis......................................... 91/6

FOREIGN PATENTS OR APPLICATIONS
1,917,954  10/1970  Germany.............................. 91/378

*Primary Examiner*—Edgar W. Geoghegan
*Assistant Examiner*—A. M. Zupcic
*Attorney, Agent, or Firm*—John T. O'Halloran; Menotti J. Lombardi, Jr.; Alfred C. Hill

[57] ABSTRACT

This relates to a master cylinder for a two-circuit system having a brake pressure medium accumulator. More particularly there is provided an arrangement for such a master cylinder that will prevent the brake pedal from traveling a great distance upon failure of one brake circuit. The master cylinder includes a master piston operating on one chamber to hydraulically apply brake pressure to said one brake circuit. The master piston is at first mechanically actuated by the brake pedal to actuate said one brake circuit. The outer surface of the master piston includes an inclined ramp that opens a valve and permits the accumulator pressure to be applied to the brake-pedal-applied end of the master piston. To prevent travel of the brake pedal upon failure of said one brake circuit, a freely axially displaceable secondary piston is provided in said one chamber. The transverse surface of the secondary piston opposite the adjacent end of the master piston is supplied with brake pressure from the accumulator via the brake-pedal-applied end of the master piston upon failure of said one brake circuit. This will move the secondary piston against the adjacent end of the master piston and prevent movement of the master piston thereby preventing undesired brake pedal travel.

24 Claims, 3 Drawing Figures

MASTER CYLINDER FOR A TWO-CIRCUIT BRAKE SYSTEM

BACKGROUND OF THE INVENTION

The invention relates to a master cylinder for a two-circuit brake system, in particular for motor vehicles, provided with at least one master piston hydraulically applying pressure to one brake circuit and on its part being mechanically pressure-applied by the brake pedal and opening a valve upon its advance. Through the opened valve the pressure of a pressure source is applied to the brake-pedal-applied side of the master piston.

The object of such a master cylinder is to use the brake pedal mainly as a control element only and to generate the actual braking pressure by means of the pressure source usually formed by an accumulator and in the event of a failure of the pressure source the force mechanically applied to the pedal is enough to generate a braking pressure which will be sufficient for at least an emergency braking.

Upon the failure of the master-piston-applied brake circuit of such a brake system the driver experiences the unpleasant feeling of the dropping-off or undesired excessive travel of the brake pedal before the remaining intact brake circuit shows any reaction. This troublesome excessive travel of the brake pedal may lead to shock reactions on the part of the driver and to all the correlating inconveniences.

SUMMARY OF THE INVENTION

Thus, it is the object of the present invention to provide a master cylinder of the type mentioned above where in the event of failure of the master-piston-applied brake circuit the excessive travel of the master piston and, hence, of the brake pedal during a braking is prevented.

A feature of the present invention is the provision of a master cylinder for a two-circuit brake system comprising: a cylindrical housing having a longitudinal axis; a master piston disposed within the housing coaxial of the axis, the master piston having a primary collar disposed adjacent one end of the master piston between the master piston and the inner surface of the housing; a brake pedal; a push rod disposed adjacent the end of the master piston opposite the one end of the master piston connected to the brake pedal to advance the master piston upon actuating the brake pedal; a first chamber disposed in the housing between the primary collar and a bottom wall of the housing disposed transverse to the axis; a first brake circuit connected to the first chamber through a first bore through the wall of the housing, the first brake circuit having pressure applied thereto upon advance of the master piston; a first source of pressurized brake pressure medium; a second source of brake pressure medium; a compensating bore extending through the wall of the housing in the first chamber spaced a first given distance from the primary collar, the compensating bore being connected to the second source; a first valve having a tappet connected thereto extending through a second bore through the wall of the housing adjacent the opposite end of the master piston, the tappet engaging the outer surface of the master piston, the first valve being opened by the tappet upon advance of the master piston to couple the pressurized brake pressure medium from the first source to the opposite end of the master piston; and a secondary piston disposed in the first chamber, the secondary piston being freely axially displaceable in the first chamber, a first surface of the secondary piston transverse to the axis and remote from the master piston having the pressurized brake pressure medium supplied thereto from the opposite end of the master cylinder when the first valve is opened and the primary collar has slid over the compensating bore.

Thus, in order to solve this problem this invention provides the arrangement of a freely displaceable secondary piston in the pressure chamber actuated by the master piston. The transverse surface of the secondary piston opposite the master piston is supplied with the pressure from the pressure source only if the master piston is also connected to the pressure source and if the primary collar of the master piston has slid over the compensation bore. In the case of a normal braking this design will ensure that both surfaces of the secondary piston are supplied with the same pressure, the transverse surface facing the master piston being acted upon somewhat earlier than the opposite transverse surface. In this way the secondary piston will remain in the final position at the bottom of the cylinder during any normal braking.

If, however, there is a failure in the master-piston-applied brake circuit the secondary piston within the cylinder bore will push forward in the direction of the master piston since in this situation only its cylinder-bottom-side transverse surface will be supplied with pressure. In this way, the excessive movement of the master piston is prevented by the secondary piston which now is resting against the adjacent end of the master piston.

According to this invention the master cylinder actuated chamber is extended beyond the connection to the first brake circuit and the secondary piston is disposed in this extension.

The side of the secondary piston opposite the master piston is preferably provided with a pin which ensures that there remains an annular chamber between the bottom and the secondary piston when the pin rests on the bottom of the master cylinder housing.

The chamber between the secondary piston and the master cylinder housing bottom is expediently connected to a pressure medium line which leads to a valve arrangement which effects the connection of the pressure source thereto. According to this invention the valve arrangement is advantageously formed by the fact that the line is connected to a master cylinder housing wall bore which in the rest position is blocked by the master piston. The distance between this wall bore to the pedal-side end of the master piston surpasses the distance between the compensation bore and the primary collar.

According to a further feature of the present invention the valve arrangement opens immediately after the compensation bore has been slid over.

The secondary piston and its associated valve are preferably used in a master cylinder of the type referred to above which is characterized by the transmission of the brake-pedal force to the master piston via a control piston disposed in a longitudinally displaceable manner in the master piston and via a spring disposed between the master piston and the control piston. The control piston includes a longitudinal bore and a transverse bore communicating with the longitudinal bore, the transverse bore being adaptable to be aligned with a bore in the master piston which leads to the pressure source valve.

According to a further feature of the present invention the master piston includes a conventional-design piston section which applies pressure to the first brake circuit and a control section axially arranged behind the piston section, the control section containing the control piston.

According to the present invention the control section as well as the piston section are cylindrical and the control section is concentric with respect to the control piston.

The control section is expediently provided with an annular cam area of inclined ascent on which the tappet of the pressure source valve rests. The pressure source is preferably a hydropneumatic accumulator.

A further feature of the present invention is to provide an annular chamber embracing the cam area which is sealed off by two seals, each seal being disposed adjacent a different end of the control section and between the control section and master cylinder housing. The annular chamber is connected to the pressure source valve via a housing wall bore, and is connected to the transverse bore of the control piston via the control section wall bore.

The master piston expediently is provided with a cylindrical connection piece disposed between the piston section and the control section, the connection piece being embraced by an annular chamber which is connected to the return tank or return reservoir of the accumulator-supplying pump.

The longitudinal bore in the master piston in which the control piston is disposed and, hence, the longitudinal bore of the control piston is expediently connected with the annular chamber about the connection piece via a connection bore in the connection piece.

According to another feature of the present invention the connection bore in the connection piece is arranged to be slid over and blocked by the control piston before the pressure source valve is opened and is arranged to communicate with the longitudinal bore in the control piston in the rest position.

According to still another feature of the present invention a concentrical cavity is provided in one portion of outer surface of the control piston and a corresponding portion of the inner surface of the control section for the purpose of receiving the pressure spring. The return spring of the master piston is preferably rated stronger than the pressure spring disposed between the master piston and the control piston due to frictional forces.

According to a further feature of the present invention the return spring of the master piston is disposed between the master piston and the secondary piston.

The master piston is preferably provided with an abutment pointing towards the secondary piston.

In accordance with an additional feature of the present invention the control piston protrudes from the control section and extends into a chamber disposed between the brake-pedal applied end of the master piston control section, the push rod and the inner surface of the housing, the protruding portion of the control piston being expediently provided with a further transverse bore in communication with this chamber and the longitudinal bore of the control piston.

In accordance with still another feature of the present invention the valve tappet has a cylindrical shape and includes grooves extending lengthwise thereof.

In accordance with still a further feature of the present invention a second brake circuit is connected to the chamber at the brake-pedal-applied end of the master piston and is actuated by only the pressure from the pressure source.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
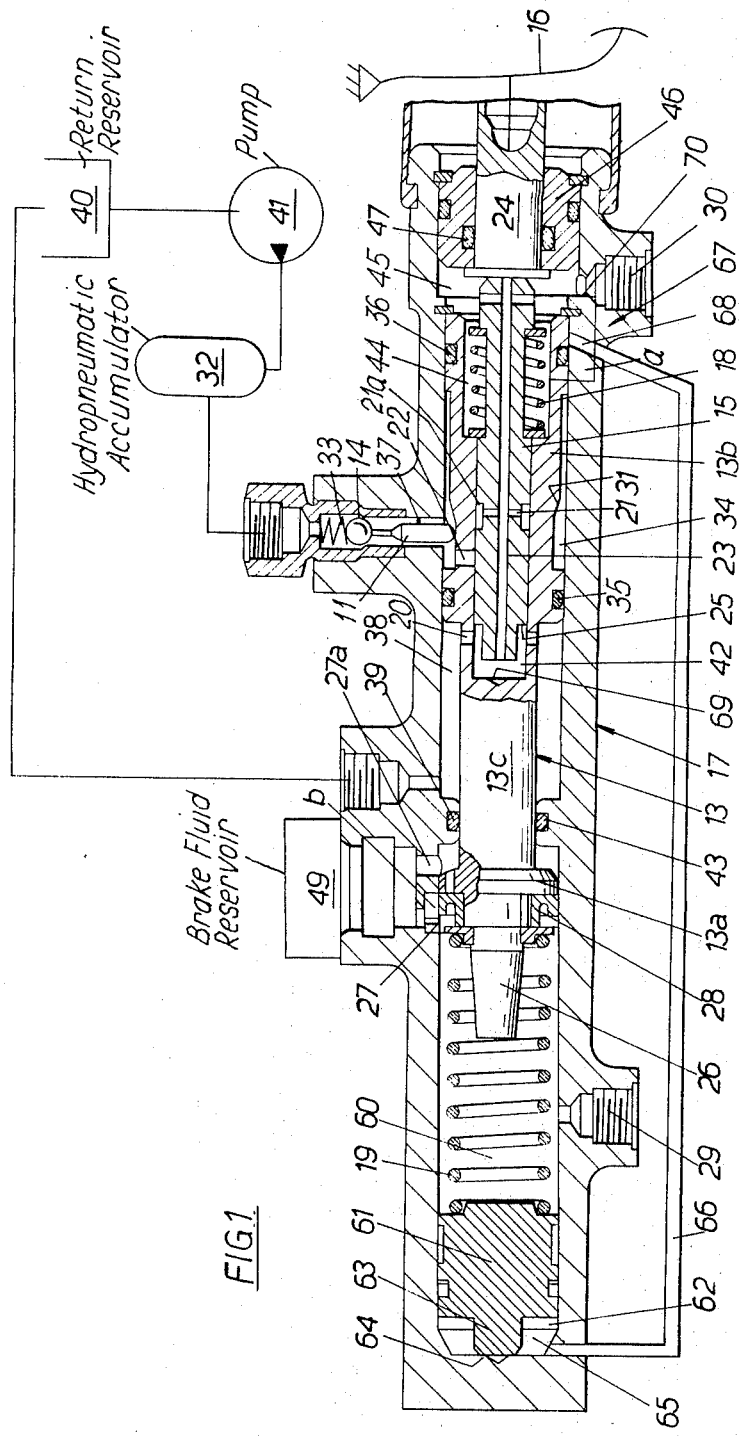
FIG. 1 illustrates a longitudinal cross section of a master cylinder in accordance with the principles of the present invention and a schematic arrangement of the accumulator pump and return tank cooperating therewith.

According to FIG. 1 a master piston 13 is disposed in a master cylinder housing 17 coaxial of the longitudinal axis of housing 17. Master piston 13 includes a conventional-design piston section 13a with primary collar 28, of a connection piece 13c of reduced diameter disposed in tandem with section 13a, and of a control section 13b disposed in tandem with connection piece 13c. Piston section 13a cooperates with a compensation bore 27 as well as with a fluid-supply bore 27a in the usual manner, bores 27 and 27a being connected to a tank or reservoir 49 containing the brake fluid or brake pressure medium.

Further, piston section 13a has an abutment 26 which upon the failure of the brake circuit 29 comes into contact with the bottom of housing 17 through the secondary piston 61 and prevents a further displacement of piston 13 in this situation.

A return spring 19 disposed between secondary piston 61 and the adjacent end of section 13a ensures that master piston 13 is always returning into its initial or rest position.

According to this invention control section 13b of the master piston 13 has a cam area 31 which is disposed annularly in the outside surface of control section 13b. Cam area 31 includes a ramp which in FIG. 1 descends from the right to the left. This ramp cooperates with the tappet 11 of a ball valve 14 disposed in the wall of housing 17. Ball valve 14 is prestressed by a pressure spring 33 in the closing direction, cam area 31 being designed such that in the rest position shown in the drawing tappet 11 extends into cam area 31 a sufficient amount so that ball valve 14 is closed. When control section 13b moving to the left in FIG. 1, tappet 11 is lifted by the ramp and opens ball valve 14.

Valve 14 is connected to a hydropneumatic accumulator 32 which is pressure-supplied by a pump 41. The return tank or return reservoir 40 of pump 41 is connected with a further wall bore 39 of housing 17 via a pressure medium line.

According to the present invention control section 13b of master piston 13 has a longitudinal cylindrical bore 42 coaxial of the longitudinal housing axis in which a control piston 15 is disposed in a longitudinally displaceable manner. In one portion of the outer surface of control piston 15 and in a corresponding portion of the inner surface of control section 13b a cavity 44 is provided which houses a spring 18 which tries to move control piston 15 out of cylindrical bore 42. According to the invention said spring 18 is rated weaker than return spring 19 of master piston 13.

According to this invention an easily manufacturable longitudinal bore 23 extends throughout the entire length of control piston 15. Further, there is a transverse bore 21 which ends in an annular groove 21a in the outer surface of control piston 15. Bore 21 is in communication with longitudinal bore 23. Bore 21 and bore 22 through the wall of section 13b have an axial spacing which will ensure that bore 21 will not become aligned with bore 22 before there has been a relative displacement between control piston 15 and control section 13b.

According to the present invention there is further a connection bore 20 through the wall of connection piece 13c. Connection bore 20 communicates with bore 42 and, hence, bore 23, on the one hand, and with an annular chamber 38, on the other hand. The axial distance between bore 20 to the bottom or adjacent end 25 of control piston 15 is such that control piston 15 blocks bore 20 before transverse bore 21 and bore 22 become aligned.

The annular chamber 38 communicates with return tank 40 of pump 41 via wall bore 39.

The push rod 24 mechanically pressure-supplied or actuated by the brake pedal 16 abuts the front end of control piston 15. Push rod 24 is extended through the housing front wall and is sealed thereto by seal 47.

According to this invention control piston 15 extends into a chamber 45 provided at the front end of housing 17 and abuts push rod 24. In the protruding portion of control piston 15 a second transverse bore 46 is provided in order to ensure that the pressure within longitudinal bore 23 is passed on into chamber 45.

The annular chamber 34 provided in cam area 31 is sealed off against the outside by means of the seals 35 and 36 so that the pressure prevailing in annular chamber 34 can proceed only via wall bore 22 provided in control section 13b.

Further connection piece 13c is sealed off from piston section 13a by means of a further annular seal 43.

Valve 14 and valve tappet 11 are housed in a corresponding opening or bore 37 through the wall of housing 17.

In the embodiment of FIG. 1 first brake circuit 29 is connected to chamber 60 which has pressure applied thereto by piston section 13a, while the second brake circuit 30 is connected to chamber 45 which has pressure applied thereto by accumulator 32 when valve 14 is opened.

According to the present invention pressure chamber 60 has disposed therein a freely axially displaceable secondary piston 61. The return spring 19 for piston 13 rests on the transverse surface of piston 61 adjacent piston 13.

A pin 63 extends outward from the transverse surface of secondary piston 61 which faces the housing bottom 64 so that an annular surface 62 and an annular chamber 65 are formed. A schematically illustrated pressure medium line 66 is connected between chamber 65 and a housing-wall bore 68 which leads to a valve arrangement 67 formed by piston section 13a and the inner surface of housing 17.

Figure 2:
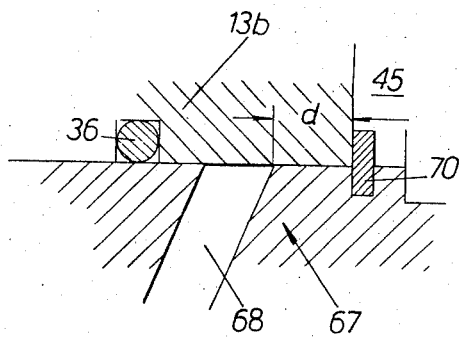
FIG. 2 illustrates an enlargement of detail $a$ of FIG. 1.
Figure 3:
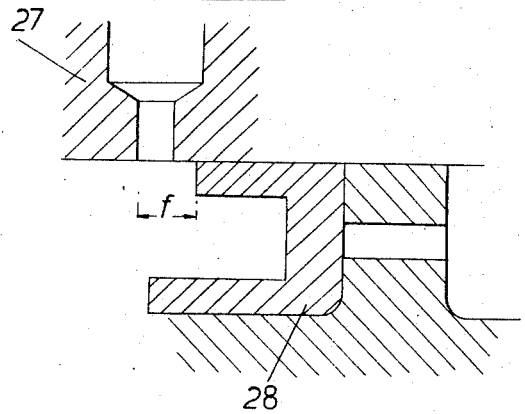
FIG. 3 illustrates an enlargement of detail $b$ of FIG. 1.

Detail a of FIG. 1 is shown on an enlarged scale in FIG. 2, while FIG. 3 shows an enlargement of detail b. According to the invention the distance d of FIG. 2 surpasses the distance f of FIG. 3.

The master cylinder of FIG. 1 operates as follows:

Upon the actuation of brake pedal 16 at first control piston 15 within control section 13b is displaced by means of push rod 24 until the adjacent end of control piston 15 abuts stop surface 69 of master piston 13. At the same time spring 18 is compressed. In this position of control piston 15 bore 22 is aligned with annular groove 21a so that annular chamber 34 communicates with chamber 45 via bore 22, annular groove 21a, bores 21, 23, and 46. Bore 20 leading to tank 40 at the same time is blocked by the advanced control piston 15.

Upon further actuation master piston 13 is displaced to the left by control piston 15. During this displacement a certain pressure builds up in brake circuit 29 and valve 14 is opened by tappet 11 sliding up along the ramp of cam area 31 of master piston 13. The pressure medium from accumulator 32 now enters chamber 45 and applies pressure to the end of master piston 13 defining in part chamber 45. Also the pressure supplied to chamber 45 is applied to second brake circuit 30. At the same time the pressure prevailing in chamber 45 acts on push rod 24 in order to exert the required reaction force on brake pedal 16. The guiding edges formed by transverse bore 22 and annular groove 21a effect the sensitive dosing of the pressure prevailing in chamber 45 and brake circuit 30 which also determines the pressure of brake circuit 29. As soon as brake pedal 16 is locked in its position the pressure medium entering chamber 45 will be able to displace master piston 13 only that amount that will cause bore 22 to cease being aligned with annular groove 21a. Thus, the further supply of pressure medium to chamber 45 is interrupted and the actuation comes to a standstill.

The release of the brake is effected by the retraction of brake pedal 16 or rather by the reduction of the brake-pedal force counter-acting the reaction force of push rod 24. In doing so, the action of spring 18 will cause the control piston 15 to move to the right in FIG. 1 whereupon bore 20 is unblocked and the pressure prevailing in chamber 45 is returned into tank 40 via longitudinal bore 23, bore 20, annular chamber 38, and wall bore 39. At the same time piston 13 will return into its initial position due to the action of return spring 19 and also due to the pressure prevailing in brake circuit 29. When piston 13 returns to its initial position valve 14 will be closed.

Brake circuit 29 is preferably connected to the front axle and brake circuit 30 is preferably connected to the rear axle. This arrangement is preferred since in the event of failure of second brake circuit 30 first brake circuit 29 will be still able to be mechanically applied with pressure by means of brake pedal 16, spring 18 being compressed until the bottom of control piston 15 comes to rest at bottom 69 of cylinder bore 42. Even upon failure of pressure source 32 this mode of operation will ensure the braking of the front wheels.

Since the distance d is rated somewhat larger than distance f, upon any normal braking with intact brake circuits 29 and 30 pressure will be at first built up in chamber 60 so that secondary piston 61 will experience a pressure force directed towards its initial position at the piston bottom 64. It is only in a later stage of the braking operation that pressure chamber 45 is connected to duct 66 by opening of valve arrangement 67 so that secondary piston 61 will also experience a pressure force of the same extent acting on its left transverse surface in FIG. 1. This pressure force, however, will not be able to displace piston 61 due to the previous building-up of pressure in pressure chamber 60 and due to the action of spring 19.

Now the situation will be considered where first brake circuit 29 fails, i.e., that upon pressing-down of pedal 16 no pressure will build up in chamber 60.

As soon as master piston 13 has advanced a sufficient amount so that bore 68 in the housing wall communicates with pressure chamber 45, the pressure prevailing in chamber 45 will circulate through line 66 into annular chamber 65 on the left-hand side of secondary piston 61. Then piston 61 is moved to the right until it abuts abutment 26. In this way, the dropping-off or excessive travel of brake pedal 16 upon a failure of brake circuit 29 is effectively prevented.

While I have described above the principles of my invention in connection with specific apparatus it is to be clearly understood that this description is made only by way of example and not as a limitation to the scope of my invention as set forth in the objects thereof and in the accompanying claims.

I claim:

1. A master cylinder for a two-circuit brake system comprising:
   a cylindrical housing having a longitudinal axis;
   a master piston disposed within said housing coaxial of said axis, said master piston having a primary collar disposed adjacent one end of said master piston between said master piston and the inner surface of said housing;
   a brake pedal;
   a push rod disposed adjacent the end of said master piston opposite said one end of said master piston connected to said brake pedal to advance said master piston upon actuating said brake pedal;
   a first chamber disposed in said housing between said primary collar and a bottom wall of said housing disposed transverse to said axis;
   a first brake circuit connected to said first chamber through a first bore through the wall of said housing, said first bore being spaced from both said primary collar and said bottom wall, said first brake circuit having pressure applied thereto upon advance of said master piston;
   a first source of pressurized brake pressure medium;
   a second source of brake pressure medium;
   a supply bore extending through the wall of said housing adjacent said first chamber in communication with said second source and said first chamber to supply brake pressure medium to said first chamber;
   a compensating bore extending through the wall of said housing in said first chamber spaced a first given distance from said primary collar, said compensating bore being connected to said second source;
   a first valve having a tappet connected thereto extending through a second bore through the wall of said housing adjacent said opposite end of said master piston;
   first means to connect said first valve to said first source;
   said tappet engaging the outer surface of said master piston, said first valve being opened by said tappet upon advance of said master piston to couple said pressurized brake pressure medium from said first source to said opposite end of said master piston;
   a secondary piston disposed in said first chamber, said secondary piston being freely axially displaceable in said first chamber and having a first surface transverse to said axis and remote from said master piston;
   an arrangement connected between said opposite end of said master piston and a point between said bottom wall and said first surface to supply said pressurized brake pressure medium to said first surface when said first valve is opened and said primary collar has slid over said compensating bore; and
   second means disposed adjacent said opposite end of said master piston in association with said arrangement to control the supplying of said pressurized brake pressure medium to said first surface through said arrangement.

2. A master cylinder according to claim 1, wherein said secondary piston is disposed in said first chamber between said first bore and said bottom wall.

3. A master cylinder according to claim 2, wherein said secondary piston includes
   a pin extending parallel to said axis from said first surface of said secondary piston to ensure the formation of a second chamber defined by said first surface of said secondary piston, said bottom wall and the inner surface of said housing parallel to said axis between said first surface of said secondary piston and said bottom wall when said pin rests against said bottom wall.

4. A master cylinder according to claim 3, further including
   a valve arrangement disposed adjacent said opposite end of said master piston between the inner surface of said housing and the outer surface of said master piston;
   a third bore through the wall of said housing communicating with said piston arrangement; and
   a pressure medium line connected between said third bore and said second chamber to supply said pressurized brake pressure medium to said first surface of said secondary piston when said first valve opens and said valve arrangement opens.

5. A master cylinder according to claim 4, wherein said third bore is spaced axially from said opposite end of said master piston by a second given distance greater than said first given distance.

6. A master cylinder according to claim 5, wherein said valve arrangement opens immediately after said compensation bore has been slid over by said compensating bore.

7. A master cylinder according to claim 6, further including a first longitudinal bore disposed in said master piston adjacent said opposite end of said master piston and coaxial of said axis;

a control piston disposed in a longitudinally displaceable manner in said first longitudinal bore; said control piston being actuated by said push rod to advance said master piston upon actuation of said brake pedal;

a first spring interconnected between said master piston and said control piston to control the relative motion of said master piston and said control piston;

a second longitudinal bore disposed within and coextensive with said control piston;

a fourth bore through the wall of said master piston in communication with said valve; and a first transverse bore disposed within said control piston in communication with said second longitudinal bore and capable of being aligned with said fourth bore upon advance of said control piston; said fourth bore, said first transverse bore and said second longitudinal bore supplying said pressurized brake pressure medium to said opposite end of said master piston when said first valve is opened.

8. A master cylinder according to claim 7, wherein said master piston includes
a piston section carrying said primary collar, and
a control section disposed in tandem relation with said piston section, said control section containing said control piston.

9. A master cylinder according to claim 8, wherein both of said piston section and said control section are cylindrical; and
said control section is concentric with respect to said control piston.

10. A master cylinder according to claim 9, further including
an annular cam area disposed in the outer surface of said master piston engaging said tappet, said cam area having a ramp portion ascending toward said opposite end of said master piston.

11. A master cylinder according to claim 10, wherein said first source includes
a hydropneumatic accumulator.

12. A master cylinder according to claim 11, further including
a third chamber disposed between the outer surface of said master cylinder and the inner surface of said housing embracing said cam area, said second bore and said fourth bore;
a first seal disposed between the outer surface of said master piston and the inner surface of said housing adjacent one end of said control section corresponding to said opposite end of said master piston; and
a second seal disposed between the outer surface of said master piston and the inner surface of said housing adjacent the other end of said control section;
said first and second seals sealing said third chamber.

13. A master cylinder according to claim 12, wherein said first source includes
a return reservoir, and a pump connected between said return reservoir and said accumulator;
said master piston further includes
a cylindrical connection piece disposed between adjacent ends of said piston section and said control section; and further including
a fourth chamber disposed between the outer surface of said connection piece and the inner surface of said housing; and
fifth bore extending through the wall of said housing in communication with said return reservoir and said fourth chamber.

14. A master cylinder according to claim 13, wherein said first longitudinal bore extends into said connection piece; and further including
a sixth bore extending through the wall of said connection piece in communication with said fourth chamber and said first longitudinal bore.

15. A master cylinder according to claim 14, wherein said sixth bore is axially spaced a given amount from the adjacent end of said control section to enable said control section to slide over and block said sixth bore before said first valve opens, and
said sixth bore communicates with said second longitudinal bore in the rest position of said master piston.

16. A master cylinder according to claim 15, further including
a cavity formed in a portion of the inner surface of said control section and a corresponding portion of the outer surface of said control piston to receive said first spring.

17. A master cylinder according to claim 16, further including
a second spring disposed between the adjacent ends of said piston section and said secondary piston to return said master piston to its rest position after the completion of a braking operation.

18. A master cylinder according to claim 17, further including
a stop surface disposed in said first longitudinal bore transverse of said axis and spaced from the end of said control piston opposite said push rod a predetermined amount; and wherein
said second spring is stronger than said first spring so that upon braking said master piston will not move before said first spring has been totally compressed and said control piston abuts said stop surface.

19. A master cylinder according to claim 18, further including
an abutment extending axially from the end of said piston section adjacent said secondary piston toward said secondary piston.

20. A master cylinder according to claim 19, further including
a fifth chamber defined by said opposite end of said master piston, the inner surface of said housing parallel to said axis and said push rod; and wherein said control piston protrudes out of said control section into said fifth chamber.

21. A master cylinder according to claim 20, further including
a second transverse bore disposed in that portion of said control piston protruding into said fifth chamber in communication with said second longitudinal bore and said fifth chamber.

22. A master cylinder according to claim 21, further including
an annular abutment extending radially from the inner surface of said housing adjacent said opposite end of said master piston to determine the rest position of said master piston.

23. A master cylinder according to claim 22, wherein said annular abutment is spaced said second given distance from said third bore and cooperates with said opposite end of said master piston.

24. A master cylinder according to claim 23, further including
a second brake circuit connected to said fifth chamber having brake pressure applied thereto from said first source when said first valve is opened.

* * * * *

UNITED STATES PATENT OFFICE
CERTIFICATE OF CORRECTION

Patent No. 3,827,242                  Dated August 6, 1974

Inventor(s)     Juan Belart

It is certified that error appears in the above-identified patent and that said Letters Patent are hereby corrected as shown below:

On the Front Page, Data Element Identifier [73] should read

"Assignee: ITT Industries, Inc., New York, N.Y."

Signed and sealed this 3rd day of December 1974.

(SEAL)
Attest:

McCOY M. GIBSON JR.                C. MARSHALL DANN
Attesting Officer                  Commissioner of Patents